United States Patent [19]

Evans

[11] Patent Number: 4,860,553
[45] Date of Patent: Aug. 29, 1989

[54] APPLIANCE LEVELING APPARATUS

[76] Inventor: Jack L. Evans, 136 Calle Arriba, Palm Springs, Calif. 92264

[21] Appl. No.: 228,939

[22] Filed: Aug. 5, 1988

[51] Int. Cl.$^4$ ............................................. F25D 19/00
[52] U.S. Cl. ...................................... 62/297; 62/298; 62/448; 62/476
[58] Field of Search ................ 62/515, 127, 131, 258, 62/295, 297, 499, 531, 298 X, 465, 448 X, 293, 476 X; 248/663; 403/114, 123

[56] References Cited

U.S. PATENT DOCUMENTS

| | | | |
|---|---|---|---|
| 2,336,418 | 12/1943 | Philipp | 62/448 X |
| 2,880,597 | 4/1959 | Wellborn | 62/297 X |
| 3,261,177 | 7/1966 | Amann et al. | 62/297 |
| 3,884,048 | 5/1975 | Schneider | 62/448 X |
| 4,459,813 | 7/1984 | Petta | 62/297 X |
| 4,659,053 | 4/1987 | Holley et al. | 403/123 X |

Primary Examiner—Lloyd L. King
Attorney, Agent, or Firm—Roger A. Marrs

[57] ABSTRACT

A leveling device is disclosed herein for automatically maintaining an absorption refrigerator and freezing unit in a level orientation which includes a ball and socket joint for pivotally mounting the unit to a fixed wall for movement about a horizontal axis. Ducts passing through the ball and socket joint interconnect freezer unit with absorption unit. A solenoid operated leveling device automatically positions the unit to a level position in response to solenoid push rods. A mercury liquid cell carried on the refrigerator unit having quadrant segments operably connects with the solenoids for selectively actuating the push rods when the liquid level changes. The ball and socket joint permits the freezer and absorption unit to automatically level itself by the gravitational pull of the earth assisted by a solenoid operated leveling device that helps position the freezer and absorption unit to a level position. A unit hold down and movable support assembly may be employed when the unit is not cantilevered from its ball and socket joint so that adjustment can be manually achieved.

4 Claims, 2 Drawing Sheets

APPLIANCE LEVELING APPARATUS

BACKGROUND OF THE INVENTION

1. Field of the Invention

The present invention relates to a leveling means for mounting an appliance on a non-level support and, more particularly, to a novel leveling means adapted to be interposed between the appliance and its refrigeranting and freezing unit that includes means to selectively sense the level position of the unit and to selectively adjust the unit position accordingly.

2. Brief Description of the Prior Art

Leveling devices are particularly needed and useful in supporting appliances such as refrigerators in trailers, campers, boats and other vehicles. With respect to refrigerators, the necessity of having the appliance level is of greatest importance. For reasons which need not herein be fully discussed, certain refrigerators of the absorption type will operate satisfactorily so long as they are level; however, if the vehicle is stopped for more than a few minutes in a non-level position, the refrigerator will cease to function unless it is nearly level. This can result in the inconvenience and probable hazard of food spoilage. Since it is not always possible to stop the vehicle on level ground, many vehicles, and especially trailers, have leveling devices associated therewith. Such devices, however, are time consuming to operate and their use is not practical unless the vehicle is to be parked for a considerable length of time.

While the usual leveling devices are satisfactory for fixed installations wherein the appliance need only be leveled when it is first installed, such devices are wholly unsatisfacory when leveling is frequently required since they are too difficult and time consuming to operate. Also, leveling devices are not automatic so that the level or non-level position of the appliance can be sensed and then appliance repositioning achieved via an actuator means.

Therefore, a long standing need has existed to provide a novel sensing and positioning device for use in connection with a leveling means whereby an appliance such as an absorption refrigerator may be readily supported and positioned in accordance to a plurality of actuators that are coupled to a level sensing means.

SUMMARY OF THE INVENTION

Accordingly, the above problems and difficulties are obviated by the present invention which, in one embodiment, provides a novel automatic leveling means for appliances such as refrigerators which includes a pivotal mount for supporting the refrigeration and freezing unit and includes an earth gravitational pull and sensing means for detecting a non-level position of the unit which is responsive, in turn, to energizing a plurality of solenoids having actuators selectively deployed to reposition the unit into a level position. Preferably, the sensing means is a mercury liquid sensor having contact segments arranged in spaced relationship with respect to a mercury liquid pool whereby any non-level position of the sensor completes electrical circuits with selected ones of the segments for operating predetermined solenoids and their associated push rod actuators. Support means may be provided for slidably and pivotally mounting the appliance in an upright position subject to displacement by the gravitational pull of the earth and a hold down device may be employed for releasably securing the appliance in a fixed position during travel or transport.

Therefore, it is among the primary objects of the present invention to provide a novel leveling device on a vehicle freezer unit having automatic means for detecting a non-level position, as determined by gravitational force, of the freezer unit and which is further responsive to energizing an actuating means for effecting reposition of the unit to a level position when the vehicle is at rest.

Another object of the present invention is to provide a novel automatic leveling system which includes a mercury pool detector sensing a non-level position of a refrigerant and freezer unit and which activates an actuator means for effecting reposition of the unit to a level position.

Yet another object of the present invention is to provide a novel pivotal means for cantilevering a refrigerant and freezer unit outwardly from an appliance that incorporates an automatic leveling means for sensing and repositioning the unit from a non-level to a level position.

Still a further object of the present invention is to provide a novel means for holding a refrigerating and freezer unit in a movable vehicle in position so that it is in fixed relationship to its supporting appliance and yet be releasable so that the unit may be manually pivoted to follow uneven terrain at a particular camping site.

BRIEF DESCRIPTION OF THE DRAWINGS

The features of the present invention which are believed to be novel are set forth with particularity in the appended claims. The present invention, together with further objects and advantages thereof, may best be understood by reference to the following description, taken in connection with the accompanying drawings in which:

DESCRIPTION OF THE PREFERRED EMBODIMENT

Figure 1:
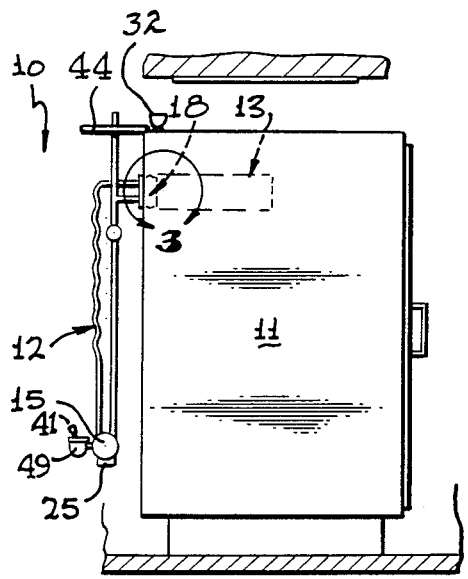
FIG. 1 is a side elevational view of a conventional absorption refrigerator including a freezing unit which incorporates the automatic leveling apparatus of the present invention.

Referring to FIG. 1, the novel leveling apparatus of the present invention is illustrated in the general direction of arrow 10 which includes an appliance 11 that takes the form of a refrigerator having an absorption unit 12 combined with a freezer unit 13. Both the absorption and freezer units are of conventional design as shown more clearly in FIG. 2 which consists of tubing 14, absorber vessel 15, the freezer unit 13, a liquid reservoir 16 and a fin condenser 17. The liquid is a mixture of ammonia, water, hydrogen gas and a cromate type compound. These substances have different boiling points and when heat is applied to the boiler, vaporization occurs and the vapors rise upwardly through the tubing in different proportion. When the vapors reach the top of their route, the vapors pass through the condenser 17. Air passing over and around the condenser extracts the heat from the vapor and it returns to a liquid state and literally falls downwardly through the tubing on its way back to the reservoir.

When the heat is absorbed from the vapor, the ammonia becomes very cold and is routed through the freezer coils inside the refrigerator where it absorbs the heat inside the refrigerator through these coils and, therefore, making the refrigerator interior cold. The tubing is slanted so the liquid will return to the reservoir by gravitation. If the refrigerator is not level, the slant of the tubing is changed and the fluid will not flow. This stops the cooling process. Each time the fluid flow stops, a chemical reaction takes place and cromate crystals form and collect on the walls of the tubing. As these crystals accumulate inside the tubing, the efficiency of the orates. Eventually, the accumulation of crystals block the tubing and orifices and the complete expensive freezing components must be replaced.

However, by employment of the present invention, leveling is maintained at all times. The absorption type refrigeration and freezing units represented by numerals 12 and 13 in combination are pivotally carried on the appliance 11 by means of a ball and socket joint indicated by numeral 18.

Figure 3:
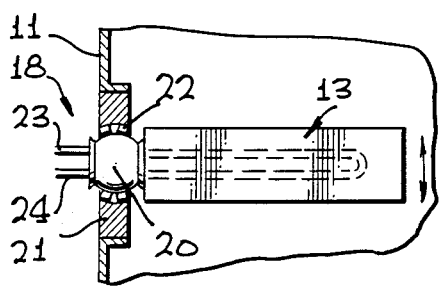
FIG. 3 is an enlarged view of the ball and socket joint shown in FIG. 1 by the arrows 3—3.

As shown in FIG. 3, the ball is indicated by numeral 20 and is located within a socket 21 having a plurality of bearings 22 separating the curvature of the socket 21 from the curvature of the ball 20. The fit is intended to be snug so that the ball will turn freely within the socket. The ball and the socket are installed in the rear wall of the refrigerator or appliance 11 and the absorption freezer unit 12 is connected to the freezer unit 13 by pipes or conduits or ducts 23 and 24 which pass through the ball 20.

Figure 2:
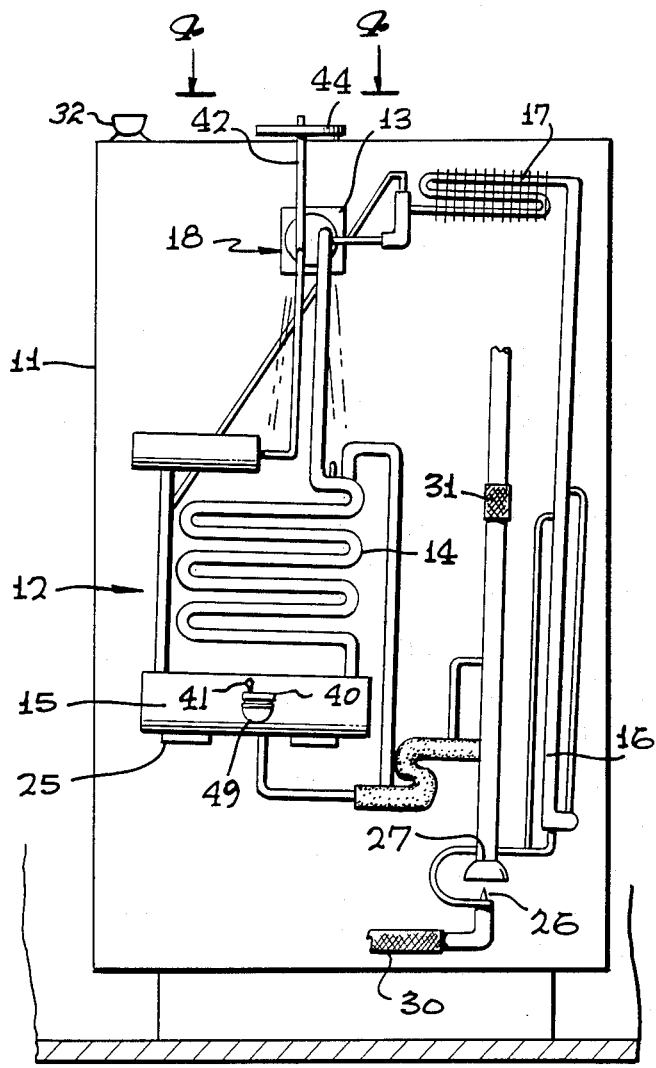
FIG. 2 is an enlarged rear elevational view of the appliance shown in FIG. 1.

Referring now to FIGS. 1 and 2, it can be seen that a weight 25 is carried beneath the reservoir 16 so that the entire absorption freezer unit 12 will hang or be suspended straight down from the ball and socket joint 18. A gas pilot 26 is fastened to the absorption freezer unit 13 so that the flame from the pilot 26 is under the boiler 27. Flexible hoses 30 and 31 are used to permit the absorption freezer unit 13 to move freely.

A level sensor 32 is carried on the refrigerator 11 which senses any gravitational force causing pivotal movement of the absorption freezer unit 12 or 13 with respect to the appliance 11. The sensor includes a vessel housing enclosing a quantity of liquid mercury whose level will follow the pivotal movement of the unit 12 and 13.

Figure 4:
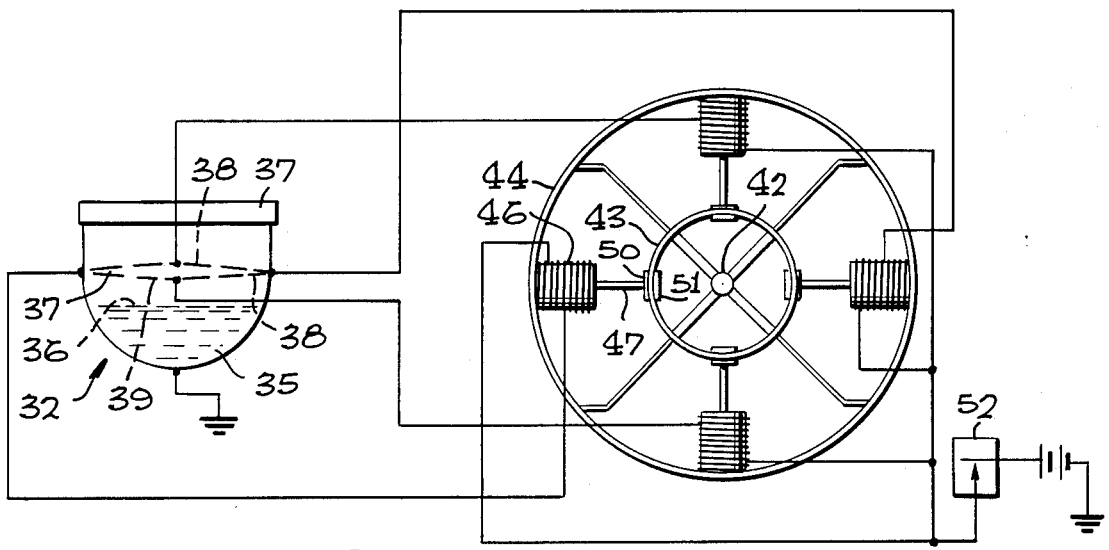
FIG. 4 is a circuit diagram of the sensing means and actuator means used in the automatic leveling apparatus employed in the embodiment shown in FIGS. 1 and 2.

As shown in FIG. 4, the sensor includes housing 35 enclosing a liquid pool 36 having a lid 37. A quadrant of metallic segments indicated by numerals 37, 38 and 39 are placed on the inside surface of the vessel 35 immediately above the surface of the mercury pool 36 when the units 12 and 13 are in an upright position. However, when the units are tilted, the mercury pool of liquid will follow the movement and contact one of the quadrant segments. In some instances, two segments may be contacted. When the unit 11 is off-level, the ball and socket joint will permit the ball to turn in the socket by the earth's gravitational pull on the absorption freezer 12 so that the units 12 and 13 will be maintained level with the earth. If the appliance 11 is off-level, the mercury in a warning sensor 49 will move to touch a metal band 40 and complete the circuit to a warning lamp 41 which will alert the user of this undesirable condition.

Referring now in detail to FIGS. 2 and 4, it can be seen that an elongated rod 42 is carried on the unit 13 and upwardly projects past the ball and socket joint 18 above the top surface of appliance 11. The top of rod 42 is connected to an automatic leveling means deriving signals from the sensor 32 which includes an inner band 43 and an outer band 44 coupled together by braces such as brace 45. A plurality of solenoids such as solenoid 46 is carried on the outer band 44 and includes a push rod or slug 47 having a terminating end which passes through a hole in inner band 43. Stops 50 and 51 are carried on the terminating end of the push rod 47 separated by the thickness of the inner ring 43. Therefore, it can be seen that if the push rod were to be moved in and out of its solenoid when the solenoid is energized, the rod will bear against the inner ring and push or pull the ring accordingly. The solenoids are respectively connected to each of the segments in the sensor 32 so that as the mercury interconnects or engages with selected ones of the segments, selected ones of the solenoids will be energized accordingly and, via the push rods, rod 42 will be positioned accordingly. A switch 52 is included in the circuit with the solenoids so as to connect a battery source of power thereto when desired. The monitor light 41 energizes when the appliance 11 pivots beyond a pre-set limit so that mercury within the sensor touches the circular band 40 to complete a battery circuit.

Therefore, it can be seen that when the refrigerator freezing unit 13 is in an "off-level" position, the mercury pool in sensor 32 will move and touch the segment or segments and provide a circuit from the battery through switch 52 and the respective solenoids. The solenoids which are energized will move their associated push rods or plungers outwardly against the inner band 43 and this in turn will position the absorption freeze unit 12 and freezer unit 13 to a "level" position. When the freezing unit becomes level, the mercury will move to its original condition and break the circuit with any of the previously contacted segments and the solenoids will become de-energized in a static condition.

Figure 5:
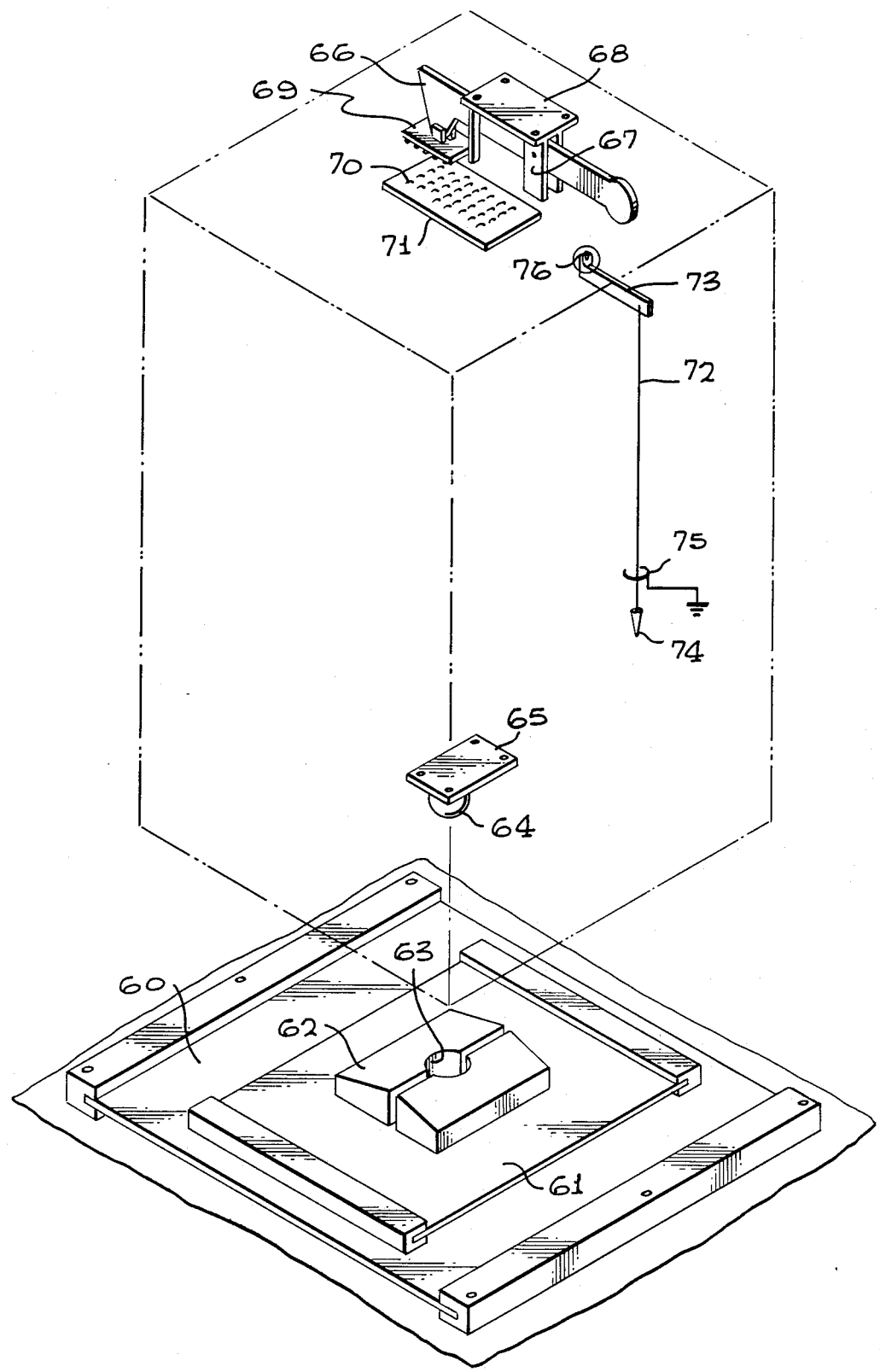
FIG. 5 is a perspective view of a novel hold down and support apparatus for an appliance.

Referring now in detail to FIG. 5, means are shown for holding the appliance 11 in a fixed or secured position during travel from place to place or the appliance may be adjusted to a universal type mount carried on the bottom thereof to accommodate a parked vehicle on uneven terrain. In one form, the mount comprises movable frames 60 and 61 which support a block 62 in the center thereof. The block includes a socket 63 into which a ball 64 is rotatably mounted. The ball downwardly depends from a plate 65 which is secured in a central location on the underside of appliance 11. By positioning frames or supports 60 and 61, the appliance may be moved to a desired orientation. With respect to the top of the appliance, a hold down latch is shown which comprises a lever arm 66 that is pivotally carried on a bracket 67 carried on the underside of a cabinet (not shown) by means of a plate 68. The end of the arm 66 includes a pivotally mounted hold down plate 69 having an irregular surface or material carried on its exposed surface. The material is in the form of a pad which is intended to engage with a similar type of material or surface 70 carried on a plate 71 fastened to the top of the appliance 11. For leveling purposes, a plumb bob may be employed having an elongated string 72 that is attached at one end to the top of the refrigerator by a beam 73 and carried a weight 74 on its opposite end. As a sensing means, a ring is disposed around the string 72 and is identified by numeral 75 which is electrically connected to a suitable ground whereby any contact of the metallic string 72 with the ring 75 will complete a circuit for energizing a lamp 76 carried on beam 73. A suitable battery is conveniently connected in the circuit to provide a source of energy for the lamp.

In view of the foregoing, it can be seen that dual automatic means are provided for leveling an appliance such as a refrigerator and that such means is responsive to displacement of the appliance or refrigerator from a level position to a non-level position. When in the non-level position, the sensing means be it the mercury pool and segments or the ring and pendulum arrangement detects the condition and actuates the circuits for automatically repositioning or alerting the user to the non-level position. The solenoid circuit in FIG. 4 discloses an automatic means for leveling the absorption refrigeration unit and freezing unit while the detector or sensor shown in FIG. 5 causes the lamp to light indicating the non-level position so that the user may then reposition the appliance accordingly.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a leveling device for appliances having refrigerator absorption and freezing units, the combination comprising:
pivotal means joining said refrigerator absorption and freezing unit together;
socket means carried on said appliance for movably mounting said refrigerator absorption and freezing unit permitting relative movement therebetween;
sensing means for detecting a non-level position of said unit; and
means operably carried on said appliance for selectively positioning said unit in response to said sensing means.

2. The invention as defined in claim 1 wherein:
said positioning means is a plurality of solenoids having movable rods and said solenoids being selectively energizable by said sensing means; and
a centering rod fixly carried on said appliance disposed between said solenoid rods and engagable therewith for repositioning said unit accordingly with respect to said appliance.

3. The invention as defined in claim 1 wherein:
said sensing means is a mercury liquid sensor having contact segments arranged in spaced relationship with respect to a mercury pool; and
electrical circuit means interconnecting said contact segments with selected ones of said solenoids for operating predetermined ones of said solenoids in response to touching of said mercury pool with selected ones of said contacts segments.

4. The invention as defined in claim 3 including:
flexible hose connections between said absorption unit and sources of gas and refrigerant supply to permit relative movement between said refrigeration absorption unit and said appliance.

* * * * *